United States Patent
Nick et al.

(10) Patent No.: US 6,918,734 B2
(45) Date of Patent: Jul. 19, 2005

(54) LOADING FLOOR FOR A VEHICLE AND LOADING APPARATUS

(75) Inventors: Albrecht Nick, Isenbüttel (DE); Wulf Thoma, Gilfhorn (DE); Werner Schwarz, Insheim (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 8 days.

(21) Appl. No.: 10/716,375

(22) Filed: Nov. 18, 2003

(65) Prior Publication Data

US 2004/0151566 A1 Aug. 5, 2004

Related U.S. Application Data

(63) Continuation of application No. PCT/EP03/03072, filed on Mar. 25, 2003.

(51) Int. Cl.$^7$ .................................................. B60P 1/00
(52) U.S. Cl. ........................ 414/522; 414/480; 414/477; 414/546; 414/629; 224/281; 224/549
(58) Field of Search ................................. 414/522, 529, 414/532, 546, 477, 480, 629; 224/281, 510, 548, 549, 556

(56) References Cited

U.S. PATENT DOCUMENTS

| | | | |
|---|---|---|---|
| 3,132,755 A | | 5/1964 | Greenslate |
| 3,768,673 A | * | 10/1973 | Nydam et al. ............... 414/522 |
| 3,809,268 A | * | 5/1974 | Lutz ............................ 414/343 |
| 4,209,278 A | * | 6/1980 | Cooper et al. ............... 414/477 |
| 4,375,306 A | * | 3/1983 | Linder ....................... 312/249.9 |
| 4,457,663 A | * | 7/1984 | Hems et al. ................. 414/522 |
| 4,681,360 A | * | 7/1987 | Peters et al. ................ 296/37.6 |
| 6,517,137 B2 | * | 2/2003 | Kiester et al. .............. 296/39.2 |

FOREIGN PATENT DOCUMENTS

| | | |
|---|---|---|
| DE | 196 19 126 A 1 | 11/1997 |
| DE | 197 49 158 A 1 | 5/1998 |
| DE | 197 31 324 A 1 | 3/1999 |
| DE | 198 15 466 | 10/1999 |
| DE | 100 37 702 | 2/2001 |

* cited by examiner

*Primary Examiner*—Khoi H. Tran
*Assistant Examiner*—Michael Lowe
(74) *Attorney, Agent, or Firm*—Martin Fleit; Paul D. Bianco; Fleit Kain Gibbons Gutman Bongini & Bianco P.L.

(57) ABSTRACT

A loading floor for a vehicle having first guide elements for engaging second guide elements of the vehicle, for lifting and extending a loading floor. The first guide elements are provisioned at the sides of the loading floor. A loading apparatus for a vehicle having a loading area with two sidewalls that border the loading area. Guide elements are provided for lifting and extending a loading floor, where the guide elements are provisioned on or in the sidewalls above the vehicle floor.

17 Claims, 6 Drawing Sheets

LOADING FLOOR FOR A VEHICLE AND LOADING APPARATUS

RELATED APPLICATION

This application is a continuation of International Application No. PCT/EP03/03072, Mar. 25, 2003, the contents of which are here incorporated by reference in their entirely.

BACKGROUND OF THE INVENTION

1. Field of the Invention

The invention relates to a loading apparatus in general, and more particularly to a loading floor for a vehicle.

2. Prior Art

Various pull-out loading floors and loading apparatuses are known from the state of the art. A pull-out loading surface for station wagons is known from DE-OS 23 02 972, wherein guide rails are provisioned on the loading surface of the vehicle. The pull-out loading surface is mounted on these guide rails and can be moved on the guide rails on rollers. The items to be loaded can then be set onto the pulled out loading surface and pushed into the loading area of the vehicle.

A loading apparatus for personal vehicles or transportation vehicles is known from DE 296 08 955 U1. This loading apparatus consists of a guide element that is mounted on the floor of the loading area of the vehicle. A movable loading plate is located on the guide element and can be moved from a transportation position inside the loading area into a loading or unloading position, in which the loading plate is located outside of the vehicle, behind the rear of the vehicle.

A loading apparatus on an automobile with a swinging rear hatch is known from DE 196 19 126 A1. Fastened guide rails that run along the length of the vehicle are provisioned on both sides of the floor of the rear loading area, which can be closed by the rear hatch of the vehicle, Loading requires that the rear hatch is moved to the back into a horizontal loading position along a lower axis that runs traverse to the vehicle.

A loading floor for the loading area of a vehicle is known from DE 197 49 158 C2. The loading floor is mounted on rollers so that it can be moved, and can be partially pulled out of the loading area approximately parallel to the vehicle. The loading floor exhibits a crumple zone, provisioned traverse to the length of the car, in order to improve crash behavior.

A pull-out loading floor for a vehicle is known from DE 197 31 324 A1, which can be moved by means of rollers along support rails. The support rails are connected to the vehicle body such that their height can be adjusted. The height adjustment occurs by means of two parallelogram steering devices, with the help of an adjustment cylinder.

A further loading floor is known from U.S. Pat. No. 3,132,755, which can be pulled out of the loading area on guide rails approximately parallel to the vehicle floor.

Pull-out loading floors and loading apparatuses of the type mentioned allow for simplified loading and unloading of the vehicle by setting the freight on the rolling loading floor. A load placed onto the pulled out loading floor can be pushed, along with the loading floor, into the interior of the vehicle without requiring much force.

However, a common disadvantage of the previously known loading floors and loading apparatuses is that, due to the pull-out mechanism for the loading floor, a considerable amount of loading area is lost.

SUMMARY OF THE INVENTION

The main object of the invention is therefore to provide an improved loading floor and an improved loading apparatus for a vehicle, in particular for an automobile with a rear hatch.

This is accomplished by the present invention by providing the structure hereinafter described in detail and as stated in the appended claims.

A special advantage of the invention is that the usable loading area is not, or is only minimally, reduced by the lift/pull-out loading floor and the corresponding loading apparatus. According to a preferred embodiment, this is accomplished such that the guide elements for the loading floor are provisioned in the sidewalls of the loading area. These are preferably guide linkages for corresponding rollers provisioned on the sides of the loading floor.

Concerning this, it is especially advantageous that the guide elements are provisioned on the sides of the loading floor, above the vehicle floor respectively, so that the loading area is not reduced or is only minimally reduced.

According to a preferred embodiment form of the invention, the guide linkages are configured in the sidewalls of the loading area such that sections of the guide linkage are configured to lift the loading floor, while other sections of the guide linkage are configured so that the loading floor can be pulled out horizontally.

According to a further preferred embodiment form of the invention, two axles with two rollers each are provisioned on the loading floor. In the retracted state of the loading floor, the rollers of one axle each engage a section of the guide linkage, which serves to lift. This section of the guide linkage is configured to be curved, so that the rollers, on the ascending side of the respective section of the guide linkage, can lift upwards.

According to a further preferred embodiment form of the invention, the loading floor is operated by means of manual force. A grip, by means of which a user can exert pulling force, due to which the loading floor is lifted along the guide linkage and then pulled out, is provisioned in a frontal region of the loading floor for this purpose.

According to a further preferred embodiment form of the invention, a drive mechanism for operating the loading floor is provisioned. This can be a mechanical drive mechanism relying on spring-power, or an electromechanical drive mechanism. In the latter case, at least one electric drive is provisioned on or in the loading floor that drives one or both roller-axles. In this case, it is preferable that curved racks are provisioned on at least the ascending sides of the respective guide linkage sections, which can be engaged by drive elements, like gear wheels for example, located on the driven axles.

A pneumatic or hydraulic drive mechanism can also be provisioned alternatively, or in addition, for the operation of the loading area.

According to a further preferred embodiment, the loading floor is lifted approx. 20 to 80 mm, preferably between 40 and 60 mm, for the purpose of extending the loading floor, where the loading floor follows a curved movement path. The movement of the loading floor then changes to a translatory outward motion. It is preferable that in this transition or process the loading floor is moved out of the loading area approx. $\frac{2}{6}$ to $\frac{5}{6}$ of its length, preferably $\frac{2}{3}$ of its length.

It is preferable that the guide linkage sections for lifting the loading floor are spaced a distance of 0.2× to 0.4× the length of the loading floor from each other.

According to a further preferred embodiment of the invention, a releasable arresting device is provisioned in order to hold the loading floor in its extended state such that it can be released. This is particularly advantageous for secure loading of the extended loading floor.

According to a further preferred embodiment of the invention, the arresting device is provisioned in the region of a loading edge of the vehicle. For example, a catch-element is located on the loading edge that engages a corresponding element on the lower side of the loading floor as soon as this element passes the catch-element while the loading floor is being extended.

According to a further preferred embodiment of the invention, the loading floor can be lifted as soon as the first pair of rollers has moved out of the back end of the guide linkage. For example, a user can then lift the loading floor slightly so that a recess in the lower side of the loading floor is moved over an arresting element in the loading edge. After loading the loading floor, the arresting element can be released, so that the loading floor can be retracted back into the loading area.

According to a further preferred embodiment of the invention, the guide linkages can be extended beyond the rear boundary of the vehicle. For this purpose a movable profile can be provisioned inside of the straight part of the guide linkage that telescopes out when the loading floor is moved outwards.

According to a further preferred embodiment of the invention, the loading floor can be extended fully automatically. For this purpose a user operates a corresponding switch or operating element on the instrument panel. The rear hatch would then be opened automatically and the loading floor extended.

BRIEF DESCRIPTION OF THE DRAWINGS

Further, preferred embodiments of the invention are explained in more detail in conjunction with the drawings, in which.

DETAILED DESCRIPTION OF PREFERRED EMBODIMENTS OF THE INVENTION

Figure 1:
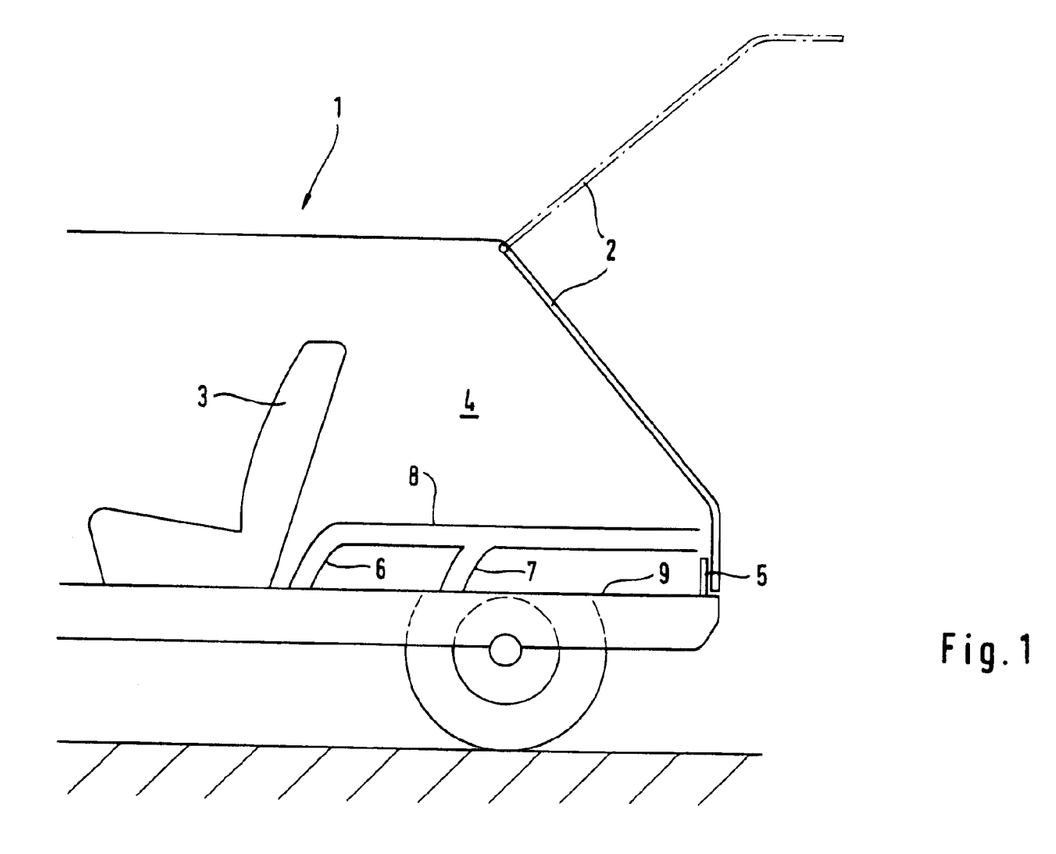
FIG. 1 shows schematically a preferred embodiment of the invention with a guide linkage in the side walls of the loading area.

FIG. 1 shows vehicle 1 with rear hatch 2. Loading area 4 is located behind rear seats 3. Loading area 4 is preferably bordered by loading edge 5 towards the rear. Loading edge 5 has the advantage that it adds to the stability of the body of vehicle 1.

One guide linkage is provisioned in both side walls of vehicle 1 in the region of loading area 4. The guide linkages consist of curved sections 6 and 7, as well as of straight sections 8. The guide linkage formed by sections 6, 7 and 8 serves to hold corresponding rollers of a loading floor.

With regard to this, sections 6 and 7 of the guide linkage reach down to, or to just above, vehicle floor 9, so that the loading floor can lay directly on vehicle floor 9. Due to this none of loading area 4 is lost, as compared with a vehicle like vehicle 1 with no retractable/liftable loading floor.

Figure 2:
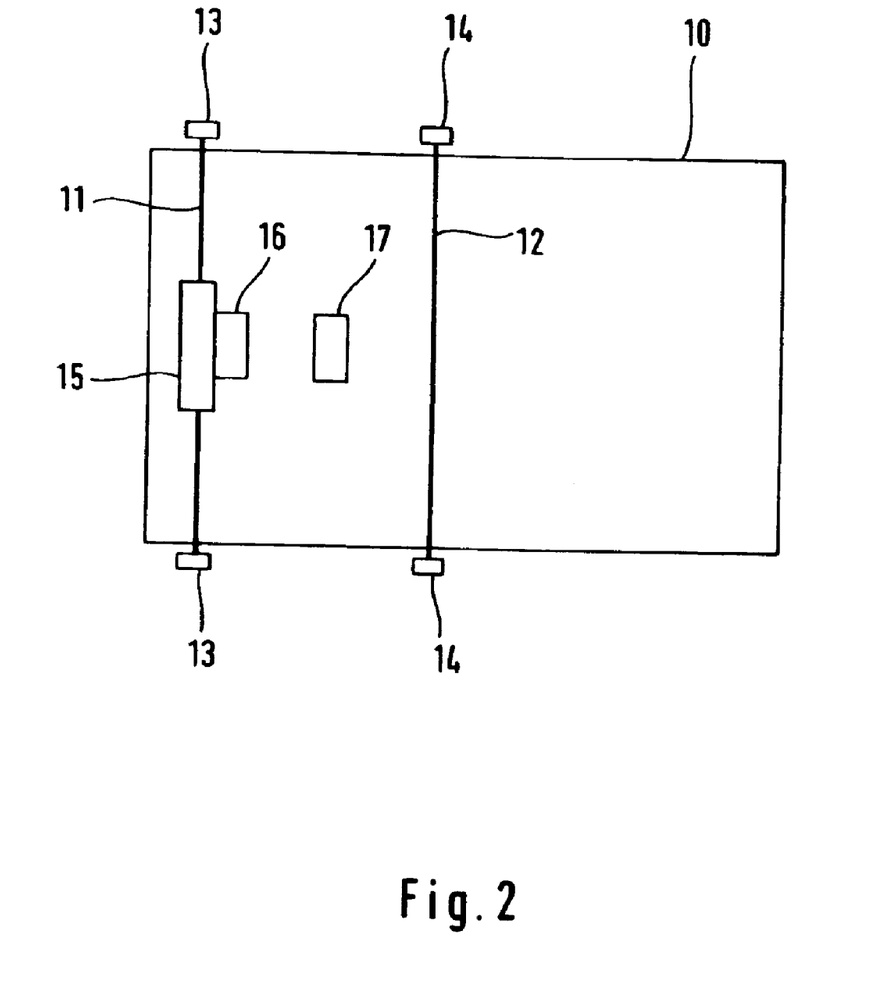
FIG. 2 shows schematically a view from below of an embodiment form of the loading floor, according to the invention, for use with a loading apparatus from FIG. 1.

FIG. 2 shows an embodiment form of loading floor 10, for use in vehicle 1 from FIG. 1. Loading floor 10 consists of, for example, a laminated plywood deck, a deck of synthetic material, a deck with a sandwich or honeycomb structure, or a sheet metal deck. Axles 11 and 12, on which rollers 13 or 14, respectively, are located, are located on loading floor 10.

In the embodiment sample shown in FIG. 2, axle 11 is driven by drive mechanism 15, where drive mechanism 15 is preferably configured with a flat shape and is at least partially integrated into loading floor 10, so that does not extend or only extends minimally beyond the lower border of loading floor 10.

In the case that drive mechanism 15 extends beyond the lower border of loading floor 10, a corresponding hollow is provisioned in vehicle floor 9 (compare with FIG. 1) for housing the section of drive mechanism 15 that extends beyond the lower boundary of loading floor 10, so that loading floor 10 can still lay flat on vehicle floor 9 (compare with FIG. 1).

Input device 16 is further provisioned on drive mechanism 15 for inputting a control signal for drive mechanism 15. By inputting a corresponding signal into input device 16, drive mechanism 15 is activated in order to extend loading floor 10.

Drive mechanism 15 is preferably an electromechanical drive mechanism with an electric motor. Other drive principals, such as mechanical, pneumatic or hydraulic drives can, however, also be implemented.

Recess 17 is further located on the lower side of loading floor 10 and serves to hold the loading floor in the extended state.

Figure 3:
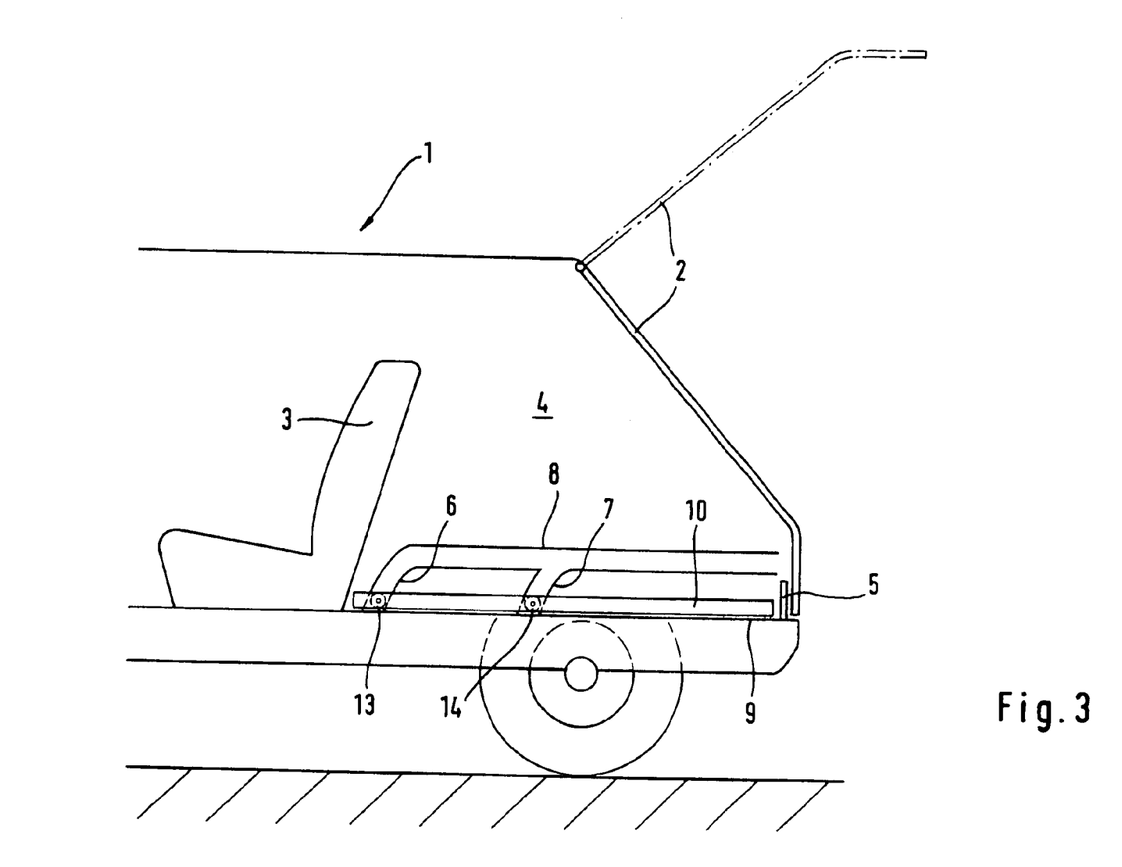
FIG. 3 shows schematically the loading apparatus from FIG. 1 with built-in loading floor in the retracted state.

FIG. 3 shows vehicle 1 from FIG. 1 with loading floor 10 from FIG. 2 in the retracted state. Rollers 13 are located in sections 6 of the guide linkage in this state, and rollers 14 are located in sections 7 of the guide linkage.

A fold-out grip can be provisioned on the upper side of the loading floor for manually extending the loading floor. In this case a user first opens rear hatch 2, then folds out the grip, then pulls loading floor 10 along sections 6 and 7 of the guide linkages into a lifted position, and lastly pulls it along section 8 of the guide linkages, partially out of loading area 4.

It is preferable that the extension of loading floor 10 out of loading area 4 occurs fully automatically. For this purpose the user operates an operating element, for example on the remote control, in the luggage compartment, or on the instrument panel of vehicle 1. A corresponding signal is then produced, which results in that rear hatch 2 is first automatically opened according to a known fashion before drive mechanism 15 is activated by input device 16, in order to extend loading floor 10.

With regard to this, the extension of loading floor 10 results from force, which is transferred from drive mechanism 15 to rollers 13 by means of axle 11. Alternatively it is also possible to drive axle 12 instead of axle 11 with rollers 14, or to drive both axles 11 and 12.

Rollers 13 and 14 then climb along the ascending flanks of sections 6 and 7 of the guide linkage, due to the drive force from drive mechanism 15, in order to bring loading floor 10 into its lifted position. It is preferable that loading floor 10 is lifted only a small distance in the process, for example between 20 and 80 mm, preferably between 40 and 60 mm. Insofar as a loading edge 5 is present, loading floor 10 is lifted such that it is located above loading edge 5.

Figure 4:
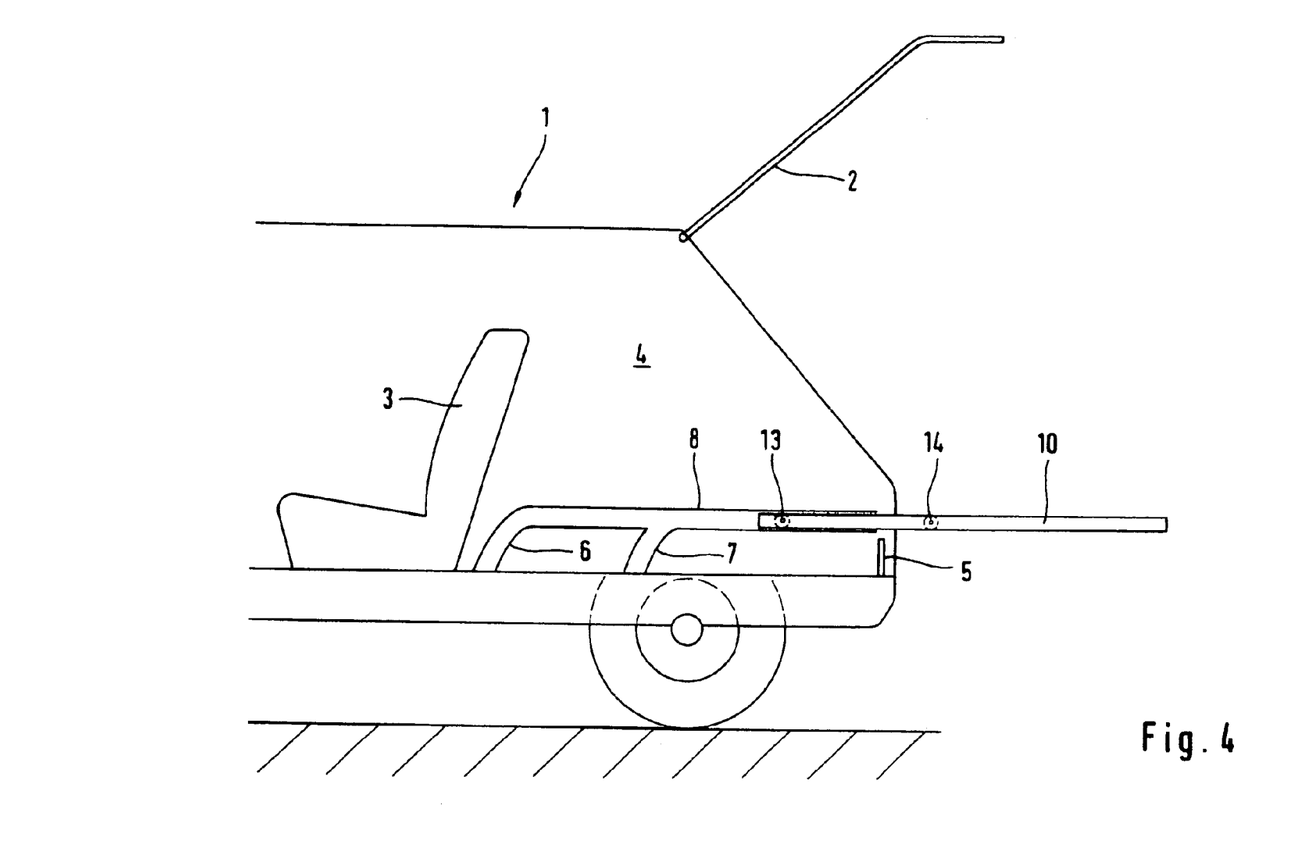
FIG. 4 shows schematically the loading apparatus from FIG. 1 with loading floor in the extended state.

FIG. 4 shows vehicle 1 after the loading floor 10 has been extended. In this state, rollers 13 are located inside sections 8 of the guide linkages. Rollers 14, however, have moved out of the rear end of section 8 of the guide linkage, so that loading floor 10 can be lifted. When a user lifts loading floor 10, a movement of rollers 13 occurs around axle 11 (compare with FIG. 2).

Figure 5:
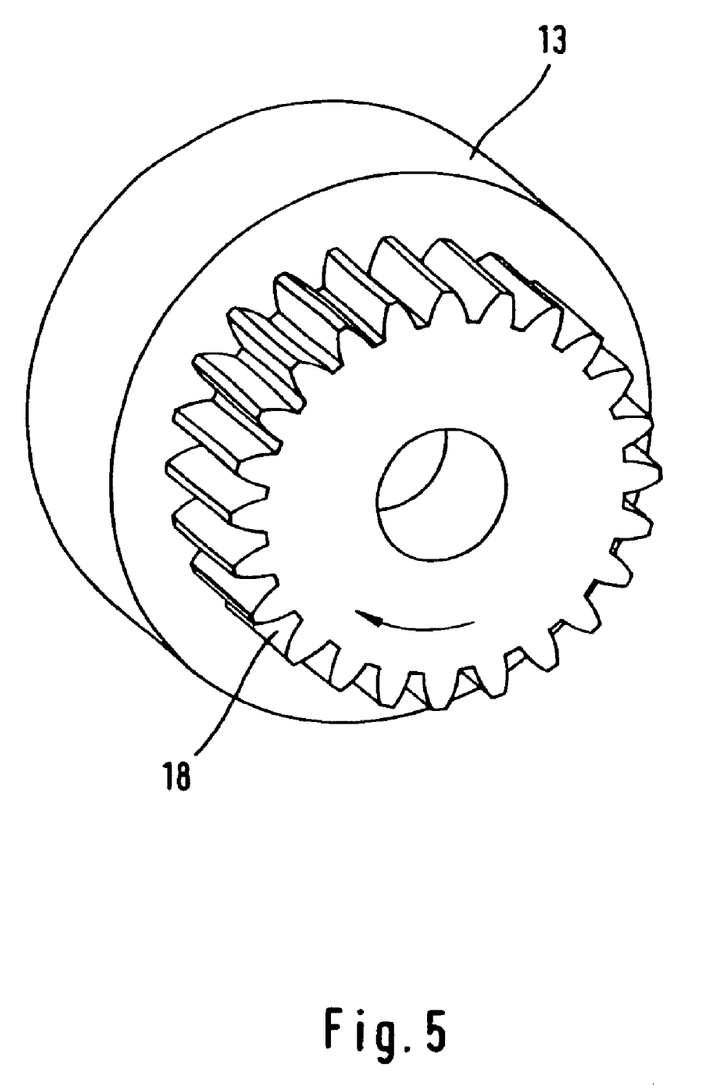
FIG. 5 shows schematically an embodiment form of a roller of the loading floor with a gear wheel as the drive element.

FIG. 5 shows an embodiment form of rollers 13. One gear wheel 18 is located on each roller 13. Gear wheels 18 engage curved racks that are provisioned on the ascending flanks of sections 6 of the guide linkages.

By activating drive 15, torque from axle 11 is exerted on gear wheels 18, so that force to lift loading floor 10 to the elevation of section 8 of the guide linkages results, due to gear wheels 18 engaging the racks in the ascending flanks of sections 6. Instead of gear wheels 18, other positive or non-positive drive elements for transferring the torque from drive mechanism 15 can also be provisioned.

Figure 6:
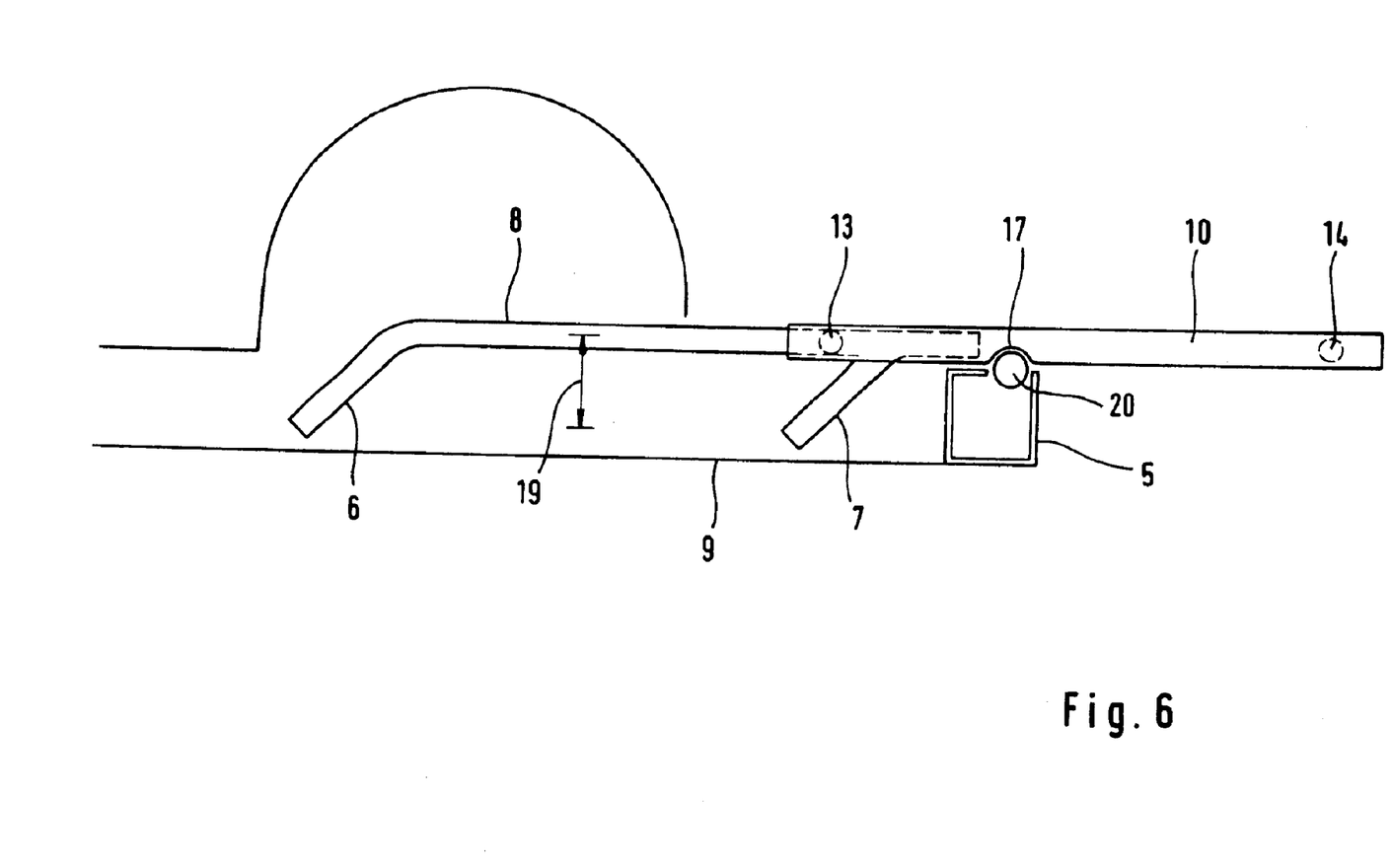
FIG. 6 shows schematically a second preferred embodiment form of the invention with an arresting element on the loading edge of the loading floor.

FIG. 6 shows a further preferred embodiment of the invention, where the same identifying numbers are used for elements that correspond to elements from FIGS. 1 through 4. In this embodiment form, loading floor 10 has ascending stroke 19 of approximately 40 mm, that is, loading floor 10 is first lifted along sections 6 and 7 of the guide linkage by stroke 19 to the level of section 8 of the guide linkage.

While moving the loading floor outwards along section 8 of the guide linkage, loading floor passes over arresting element 20. Arresting element 20 is, for example, provisioned on a spring and is pressed into loading edge 5 as loading floor 10 is moved outwards. As soon as recess 17 in loading floor 10 passes over loading edge 5, arresting element 5 springs into the position shown in FIG. 5, so that loading floor 10 is held fast to loading edge 5.

In the embodiment shown, loading floor has a length of approximately 1.2 to 1.3 meters and is moved out approximately 600 mm over loading edge 5 over the rear of the vehicle. In this position, loading floor 10 is then loaded. After loading has concluded, arresting element 20 is released. This can, for example, occur electromechanically by releasing a stroke magnet or something similar to release the spring. Loading floor 10 is then manually or automatically retracted back into the loading area.

| Legend | |
|---|---|
| vehicle | 1 |
| rear hatch | 2 |
| rear seats | 3 |
| loading area | 4 |
| loading edge | 5 |
| section | 6 |
| section | 7 |
| section | 8 |
| vehicle floor | 9 |
| loading floor | 10 |
| axle | 11 |
| axle | 12 |
| roller | 13 |
| roller | 14 |
| drive mechanism | 15 |

| -continued | |
|---|---|
| Legend | |
| input device | 16 |
| recess | 17 |
| gear wheel | 18 |
| stroke | 19 |
| arresting element | 20 |

What is claimed is:

1. A vehicle comprising a vehicle body having side walls, a rear structure, seats for occupants and a planar loading area behind the rearmost seats extending between the vehicle sidewalls to the rear structure, the rear structure of the vehicle including a rear hatch that can swing open to expose and render accessible the loading area, and a loading edge having a predetermined vertical height extending across the loading area and interconnected to the vehicle sidewalls, a first horizontal guide channel formed in each vehicle side wall at a vertical height above the loading area that is greater than the predetermined vertical height of the loading edge, the first horizontal guide channel extending from the vehicle rear structure forward toward the rearmost seats and terminating at its forward end spaced from the rearmost seats, a second vertically depending downwardly guide channel formed in each vehicle side well extending forwardly at an acute angle from and as a continuation of the forward end of the first horizontal guide channel in that vehicle sidewall and terminating at its lower end at the plane of the loading area adjacent but spaced from the rearmost seats of the vehicle, a third vertically depending downwardly guide channel formed in each vehicle side wall extending forwardly at an acute angle from a point intermediate the ends of the first horizontal guide channel in that vehicle sidewall as a branch of the first horizontal guide channel and terminating at its lower end at the plane of the loading area, an elongated loading floor lying adjacent the plane of the loading area and extending laterally of the vehicle from one vehicle side to the other vehicle side and longitudinally of the vehicle from adjacent the rearmost seats to adjacent the rear structure to substantially cover the entire loading area, a first pair of guide members mounted on the loading floor and positioned respectively in the second vertically depending downwardly guide channels at their lower terminal ends for cooperation therewith, a second pair of guide members mounted on the loading floor and positioned respectively in the third vertically depending downwardly guide channels at their lower terminal ends for cooperation therewith, whereupon when the rear hatch or the vehicle is open, and a force is exerted upon the loading floor in a rearward direction, the loading floor will rise up vertically to the level of the first guide channels and then move rearwardly over the loading edge and out the open rear of the vehicle.

2. A vehicle according to claim 1 wherein a first axle member having first and second ends is mounted transversely on the loading floor below its upper surface with the first pair of guide members being mounted, respectively, on the first and second ends of the first axle member.

3. A vehicle according to claim 2 wherein a second axle member having first and second ends is mounted transversely on the loading floor below its upper surface with the second pair of guide members being mounted, respectively, on the first end second ends of the second axle member.

4. A vehicle according to claim 3 wherein racks are positioned in the second and third guide channels, and gears are fixed to all of the guide members in meshing engagement with the racks, and a drive mechanism is provided for the first and second axels.

5. A vehicle according to claim 3 wherein a drive mechanism is provided for at least one of the axel members, or lifting/pulling out and pulling in/lowering the loading floor.

6. A vehicle according to claim 5 wherein the drive mechanism is one of a mechanical, electromechanical, pneumatic and hydraulic drive mechanism.

7. A vehicle according to claim 1 wherein a grip is provided for lifting and pulling out the loading floor by a user.

8. A vehicle according to claim 7 wherein the grip is accommodated in a portion of the loading floor adjacent the rear structure in a fold-out manner.

9. A vehicle according to claim 1 wherein a drive mechanism is provided for at least one of the first guide members, for lifting/pulling out and pulling in/lowering the loading floor.

10. A vehicle according to claim 9 wherein the drive mechanism is one of a mechanical, electromechanical, pneumatic and hydraulic drive mechanism.

11. A vehicle according to claim 1 wherein at least one of the second guide channels is provided with a rack, and the guide member positioned in said at least one of the second guide channels is provided with a gear for meshing with the rack.

12. A vehicle according to claim 1 wherein the second and third guide channels are spaced apart from about 0.2× to about 0.4× the length of the loading floor, in the pull-out direction.

13. A vehicle according to claim 1 wherein an arresting member is provided for releasably arresting the loading floor in its extended position.

14. A vehicle according to claim 13 wherein the arresting member is mounted juxtaposed to the loading edge.

15. A vehicle according to claim 14 wherein the arresting member comprises a spring loaded ball coacting with a recess in the bottom of the loading floor.

16. A vehicle according to claim 1 wherein the vertical rise of the second and third guide channels is from about 20 to about 80 mm, and the vertical rise of the loading edge is from less that about 80 to less than about 20 mm.

17. A vehicle according to claim 1 wherein the vertical rise of the second and third guide channels is from about 40 to about 80 mm and the vertical rise of the loading edge is from less that about 60 to less than about 40 mm.

* * * * *